Dec. 8, 1964    R. G. RUTHERFORD    3,160,328
SEED SOWER
Filed Jan. 21, 1963

INVENTOR
ROBERT GEORGE RUTHERFORD
By Hane and Nydick
ATTORNEYS

3,160,328
SEED SOWER
Robert George Rutherford, Cheeseman's Creek, Nyrang,
New South Wales, Australia
Filed Jan. 21, 1963, Ser. No. 252,953
Claims priority, application Australia, Jan. 23, 1962,
13,590/62
7 Claims. (Cl. 222—196)

This invention has been devised to provide a seed sower for attaching to an appropriate movable carrier (farming implement), such as a tractor-drawn or tractor-mounted cultivator. This seed sower will maintain an even flow of seed through an outlet or a number of outlets without the aid of mechanically actuated seed discharging apparatus.

It is known to provide a seed box having spring wires extending through seed outlets. The wires are of such length as is necessary to contact the ground over which the seed box is carried. This ground contact is for the purpose of vibrating the wires to cause seeds to fall through the seed outlets. With the wires dragging on the ground, it is not practicable to accurately direct the seed into a furrow made by a tine as in the operation of sod seeding. The present invention overcomes this problem.

According to the invention the seed sower consists of a seed box adapted to be mounted on the movable carrier. The seed box has a seed outlet in the bottom thereof. A pendulum-like agitator is suspended in the seed box with the weighted end of the agitator located above the seed outlet. A partition in the seed box, which is located above the weighted end of the agitator, has an opening therein through which the agitator passes. Means are provided for varying the size of the passage to the seed outlet.

The invention will be described with reference to the annexed drawings, wherein.

Figures 1, 2:
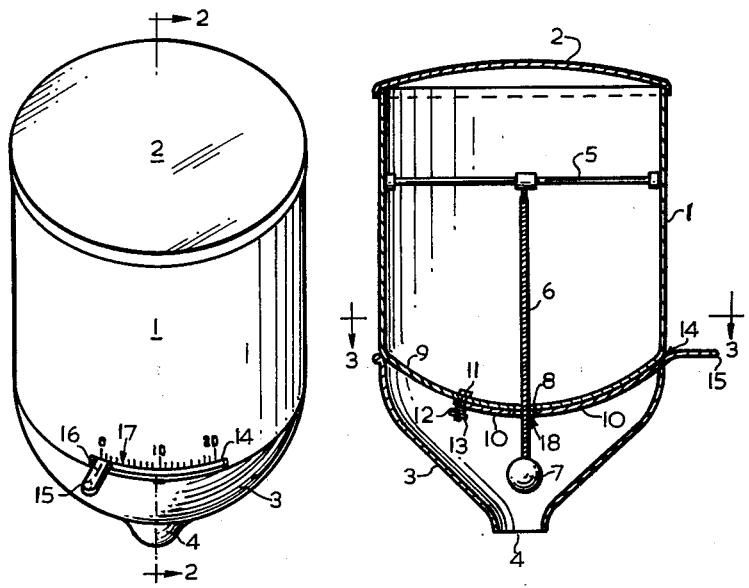
FIGURE 1 is a perspective view of the seed sower.
FIGURE 2 is a sectional view on the plane 2—2 of FIGURE 1.

As illustrated, the seed box 1 is a cylindrical, open-top container provided with a lid 2 and a funnel-like seed outlet member 3 projecting downwardly from the seed box 1 and having an outlet opening 4 in the form of a delivery pipe therein. The member 3 is fixed to the seed box 1 in any suitable manner. In addition, the seed box 1 has an agitator supporting member (cross-bar) 5 fixed therein from which is suspended an agitator 6, said agitator 6 as shown being a coil spring having a weight 7 on its lower end located above the outlet 4, said agitator 6 passing through an opening 8 formed in a partition 9 formed integrally with said seed box 1. The partition 9 is located above the weighted end of the agitator 6.

Adjusting means for varying the size of the opening 8, consists of a slide 10 which is connected at one of its ends to the underside of the partition 9 by a screwed pivot pin 11 which latter has a nut tensioning spring 12 and nut 13 thereon. The other end of the slide 10 projects through a slot 14 formed between the seed box 1 and the member 3 to form a hand grip 15. The hand grip has an indexing mark 16 thereon for setting relative to suitable graduations 17 formed on the seed box 1.

Figure 3:
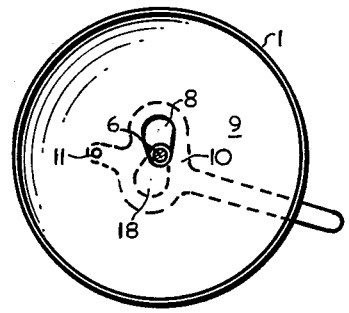
FIGURE 3 is a sectional view on the plane 3—3 of FIGURE 2.

The slide 10 has an opening 18 therein which corresponds to the opening 8 in the partition 9, and the agitator 6 passes through both openings 8, 18. The openings 8, 18 are substantially pear-shaped with their narrower ends located on opposite sides of their longitudinal axis, said narrower ends having a radius of curvature which is substantially equal to the radius of the agitator 6 (coil spring). As illustrated in FIGURE 3, when the slide 10 is moved to "outlet closed" position, the agitator 6 is engaged between the narrower ends of the openings 8, 18. By moving the slide 10 towards its other extreme position, the size of the passage through the openings 8, 18 around the agitator 6, is varied.

Figure 4:
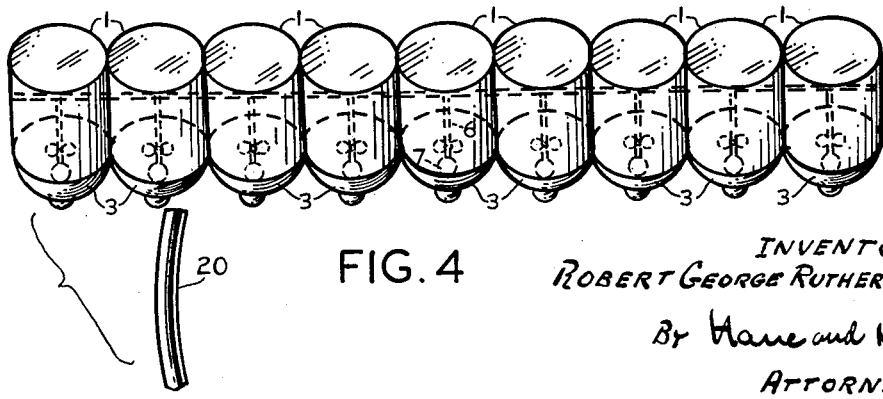
FIGURE 4 is a schematic perspective view of a plurality of seed boxes as they would appear assembled on a suitable carrier.

FIG. 4 shows a plurality of the aforedescribed seed sowers disposed in a row. A tine 20 is shown adjacent to the outlet end of the sower.

I claim:

1. A seed sower comprising a seed box adapted to be mounted on a movable carrier, said seed box having a seed outlet in the bottom thereof, a partition wall dividing said seed box into an upper and a lower compartment, the lower compartment including said outlet, said partition wall having an opening therethrough for passage of seed from the upper compartment into the lower compartment, a swingable agitator suspended at one end in the upper compartment and protruding with play through said opening into the lower compartment to permit a limited movement of the agitator within said opening, the end of the agitator protruding into the lower chamber being weighted and terminating spaced apart from said outlet, and regulating means for gradually varrying the size of the opening, said regulating means including a slide rotatably connected at one of its ends to the partition wall, said slide having an opening corresponding to the opening in said partition wall through which the agitator passes, whereby movement of said slide varies the passage for the seed.

2. A seed sower according to claim 1, wherein the seed box comprises a cylindrical open-top container, a lid for closing the open top, said partition wall forming the bottom of the container to define said upper chamber, and a funnel-like member fixed outwardly of said bottom and projecting downwardly thereof to define said lower chamber, the narrow end of the funnel-like member constituting said outlet.

3. A seed sower according to claim 2, wherein the funnel-like member terminates in a delivery pipe for discharging seed in juxtaposition to a tine.

4. A seed sower according to claim 1, wherein the agitator comprises a coil spring suspended at its upper end from a cross-bar fixed in the seed box in the upper chamber thereof and a weight on its lower end in the lower chamber.

5. A seed sower according to claim 1, wherein the openings in the partition and in the slide are substantially pear-shaped with their narrower ends located on opposite sides of their longitudinal axis, said narrower ends having a radius of curvature substantially equal to the peripheral outline of the agitator.

6. A seed sower according to claim 1, wherein the slide is connected at its said one end to the partition wall by a pivot pin and spring-tensioned nut and has its other end a hand-grip projecting outwardly through a slot in the seed box located between the seed outlet and the partition wall.

7. A seed sower according to claim 1, wherein the partition is concave in section.

References Cited by the Examiner
UNITED STATES PATENTS

| | | | |
|---|---|---|---|
| 65,430 | 6/67 | Putnam | 222—564 X |
| 1,470,049 | 10/23 | Barrows | 222—518 X |
| 2,312,730 | 3/43 | Ring | 222—230 |
| 2,687,598 | 8/54 | Calhoun | 222—500 X |

LOUIS J. DEMBO, *Primary Examiner.*